(12) United States Patent
Lee et al.

(10) Patent No.: US 7,940,075 B2
(45) Date of Patent: May 10, 2011

(54) DIFFERENTIAL PRE-EMPHASIS DRIVER

(75) Inventors: Duk Hyo Lee, Seoul (KR); Byung Tak Jang, Gyeonggi-do (KR)

(73) Assignee: Dongbu Hitek Co., Ltd., Seoul (KR)

( * ) Notice: Subject to any disclaimer, the term of this patent is extended or adjusted under 35 U.S.C. 154(b) by 0 days.

(21) Appl. No.: 12/614,835

(22) Filed: Nov. 9, 2009

(65) Prior Publication Data

US 2010/0117688 A1      May 13, 2010

(30) Foreign Application Priority Data

Nov. 12, 2008   (KR) .................. 10-2008-0112040

(51) Int. Cl.
*H03K 17/16*   (2006.01)
*H03K 19/003*   (2006.01)

(52) U.S. Cl. ............ 326/26; 326/115; 326/127; 326/86; 327/108

(58) Field of Classification Search ............... 326/21–24, 326/29–31, 82–83, 86–87; 327/108, 109
See application file for complete search history.

(56) References Cited

U.S. PATENT DOCUMENTS

| 6,288,581 | B1* | 9/2001 | Wong | 327/108 |
| 6,956,407 | B2 | 10/2005 | Baig et al. | |
| 2008/0042725 | A1* | 2/2008 | Aoki | 327/333 |
| 2008/0136465 | A1* | 6/2008 | Takagi | 327/108 |

FOREIGN PATENT DOCUMENTS

JP   2006-311446 A   11/2006

* cited by examiner

*Primary Examiner* — Rexford N Barnie
*Assistant Examiner* — Jany Tran
(74) *Attorney, Agent, or Firm* — Saliwanchik, Lloyd & Eisenschenk

(57) ABSTRACT

Disclosed is a differential pre-emphasis driver. The driver includes a first current source supplying a first current, a second current source supplying a second current greater than the first current, a first select circuit for selectively connecting the first current source to a first output terminal or a second output terminal, and a second select circuit for selectively connecting the second current source to the first output terminal or the second output terminal. The first and second select circuits pre-emphasize a transmission signal by selectively combining the first output terminal, the second output terminal, the first current source and the second current source.

7 Claims, 5 Drawing Sheets

(a)

(b)

DIFFERENTIAL PRE-EMPHASIS DRIVER

CROSS-REFERENCE TO RELATED APPLICATION

This application claims the benefit under 35 U.S.C. §119 of Korean Patent Application No. 10-2008-0112040, filed Nov. 12, 2008, which is incorporated herein by reference in its entirety.

BACKGROUND

When data is transmitted between chips through an internal transmission path, or when data is transmitted between a transmitter and a receiver through an external transmission path, signal distortion may occur if the bandwidth of the transmission path is insufficient.

For instance, a baseband signal of several hundred MHz can be expressed as a sum of pure sine waves in a frequency domain. At this time, high-frequency components may be attenuated, so that the signal distortion may occur in a period where a great number of high-frequency components exist.

For this reason, the receiver does not receive the signal having sufficient size and shape, causing difficulty in signal analysis.

In order to solve the above problem, a pre-emphasis scheme is adopted. The pre-emphasis scheme is an equalization technique realized in a transmitter terminal.

According to the pre-emphasis scheme, a signal period having a great number of high-frequency components is amplified more than other signal periods by taking the attenuation of the high-frequency components into consideration before a signal is transmitted. Thus, the bandwidth can be enlarged and the transmission speed can be increased if the pre-emphasis scheme is adopted.

FIG. 1 is a graph showing an example of signal processing by using the pre-emphasis scheme, in which the x-axis represents time and the y-axis represents current.

Referring to FIG. 1(a), signal distortion occurs when a signal change is generated (see dashed lines). Thus, as shown in FIG. 1(b), the signal periods subject to the signal change are amplified at a predetermined rate according to the pre-emphasis scheme before the signal is transmitted.

However, if the signal periods are amplified through the pre-emphasis scheme by controlling a current source, the following problems may occur. First, because a current source control circuit is complicated, the driving of the current source control circuit is difficult and a circuit area is enlarged. Second, the transmission time must be synchronized between the transmitter and the receiver according to the control of the current source. Third, when a DC current source operates at a high speed, noise may be generated.

BRIEF SUMMARY

The present disclosure provides a differential pre-emphasis driver. According to an embodiment, the subject differential pre-emphasis driver has a simple circuit structure without requiring synchronization between a transmitter and a receiver, and can minimize noise while operating at a high speed.

The differential pre-emphasis driver according to an embodiment includes: a first current source supplying a first current; a second current source supplying a second current greater than the first current; a first select circuit for selectively connecting the first current source to a first output terminal or a second output terminal; and a second select circuit for selectively connecting the second current source to the first output terminal or the second output terminal, wherein the first select circuit and the second select circuit pre-emphasize a transmission signal by selectively combining the first output terminal, the second output terminal, the first current source and the second current source.

The differential pre-emphasis driver according to another embodiment includes: a first current source supplying a first current; a second current source supplying a second current greater than the first current; a third current source supplying an average magnitude of the first current and the second current; a fourth current source supplying an average magnitude of the first current and the second current; a first select circuit including a first switching point connected to the first current source for switching into a first contact point or a second contact point; and a second select circuit including a second switching point connected to the second current source for switching into a third contact point or a fourth contact point, wherein the first contact point is connected to the third current source, the first output terminal and the third contact point, and the second contact point is connected to the fourth current source, the second output terminal and the fourth contact point.

DETAILED DESCRIPTION

Hereinafter, a differential pre-emphasis driver according to embodiments will be described in detail with reference to accompanying drawings.

In the following description of embodiments, a detailed description of known functions and configurations incorporated herein will be omitted when it may make the subject matter of the present invention rather unclear. The following description will be focused on the subject matter directly related to the technical scope of the embodiments.

Figure 1:
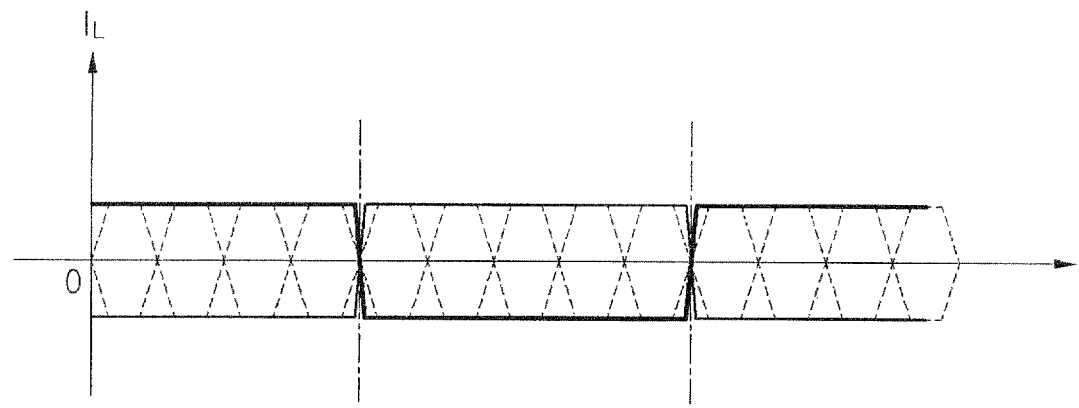
FIG. 1 is a graph showing an example of signal processing by using a pre-emphasis scheme, in which the x-axis represents time and the y-axis represents current.
Figure 1:
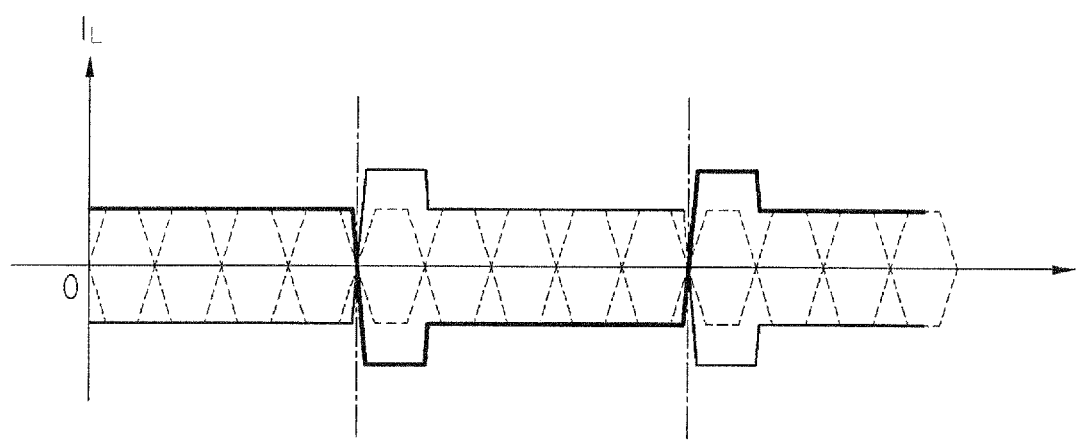
Figure 2:
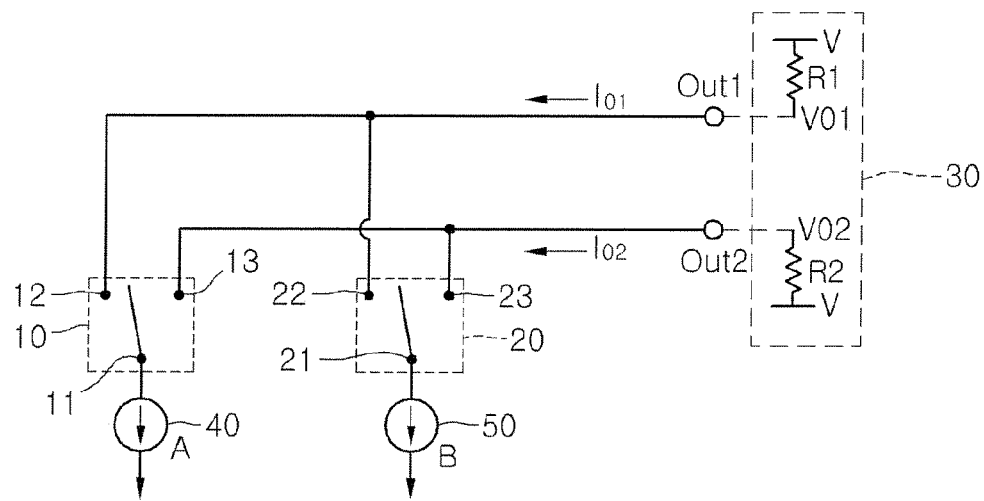
FIG. 2 is a circuit view schematically showing elements of a differential pre-emphasis driver according to a first embodiment.
Figure 3:
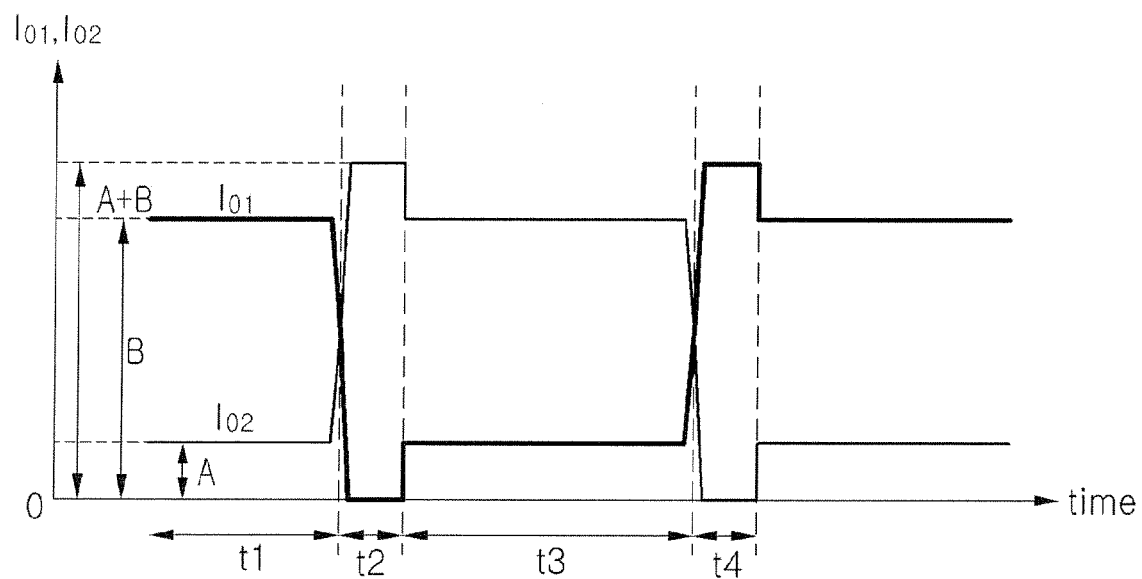
FIG. 3 is a graph showing a signal processed by a differential pre-emphasis driver according to a first embodiment.

FIG. 2 is a circuit view schematically showing elements of a differential pre-emphasis driver according to a first embodiment, and FIG. 3 is a graph showing a signal processed by a differential pre-emphasis driver according to the first embodiment.

Referring to FIG. 2, the differential pre-emphasis driver according to the first embodiment includes a first current source 40, a second current source 50, a first select circuit 10, a second select circuit 20, a first output terminal out1, and a second output terminal out2.

The first current source 40, the second current source 50, the first select circuit 10, the second select circuit 20, the first output terminal out1, and the second output terminal out2 constitute a transmitter circuit. A receiver circuit 30 is connected to the first output terminal out1 and the second output terminal out2 through a transmission path.

The circuit shown in FIG. 2 represents an equivalent circuit obtained by connecting the transmitter circuit, the transmission path and the receiver circuit 30 to one another. A power terminal V exists in the receiver circuit 30. The power terminal V is connected to the first output terminal out1 and the second output terminal out2 through the transmission path (shown as a dotted line) and resistors R1 and R2.

Thus, the receiver circuit 30 can recover data by synthesizing a signal having voltage V01 of the first output terminal out1 with a signal having voltage V02 of the second output terminal out2. For reference, a data recovery circuit is not shown in FIG. 2, but an example of the synthetic data is shown in the graph of FIG. 3.

An output terminal of the first current source 40 is connected to a ground terminal and an input terminal of the first current source 40 is connected to a first switching point 11 of the first select circuit 10, thereby forming the equivalent circuit to supply first current A.

An output terminal of the second current source 50 is connected to a ground terminal and an input terminal of the second current source 50 is connected to a second switching point 21 of the second select circuit 20, thereby forming the equivalent circuit to supply second current B.

Intensity of the output currents, including first and second currents A and B, are shown in the graph of FIG. 3. For the graphs shown in FIGS. 3, 5, 7, and 9, the x-axis represents time and the y-axis represents current. In addition, the current symbol "$I_{o1}$" represents current of the first output terminal out1, and a current symbol "$I_{o2}$" represents current of the second output terminal out2.

The first select circuit 10 and the second select circuit 20 may include a semiconductor switching device, such as a SPDT (Single Pole Double Throw).

A first contact point 12 of the first select circuit 10 and a third contact point 22 of the second select circuit 20 are connected to the first output terminal out1, and a second contact point 13 of the first select circuit 10 and a fourth contact point 23 of the second select circuit 20 are connected to the second output terminal out2.

Therefore, the first and second select circuits 10 and 20 can pre-emphasize the transmission signal by selectively combining the first output terminal out1, the second output terminal out2, the first current source 40 and the second current source 50. Hereinafter, the pre-emphasis operation will be described with reference to FIG. 3.

The first and second select circuits 10 and 20 according to the first embodiment perform the pre-emphasis operation by selectively combining current paths when there is a change in data transmission periods (see vertical dotted lines).

In the case that the first current source 40 is connected to the second output terminal out2 by the first select circuit 10 and the second current source 50 is connected to the first output terminal out1 by the second select circuit 20, signals $I_{o1}$ and $I_{o2}$ are output from the first and second output terminals out1 and out2 as shown in the period "t1" of FIG. 3.

That is, the current of the first output terminal out1 is "B" and the current of the second output terminal out2 is "A".

At this time, if there is a change in the data transmission periods (if there is attenuation in high-frequency band), the first and second select circuits 10 and 20 perform the pre-emphasis through a switching operation.

That is, if the pre-emphasis operation is performed in the "t1" state, the first select circuit 10 maintains connection between the first current source 40 and the second output terminal out2, and the second select circuit 20 switches the current path of the second current source 50 to the second output terminal out2.

Thus, in the period "t2", the current of the first output terminal out1 is "0", and the current of the second output terminal out2 is "A+B".

In the case that the period "t3" starts after stopping the pre-emphasis operation in the period "t2", the first select circuit 10 switches the current path of the first current source 40 to the first output terminal out1 and the second select circuit 20 maintains the connection between the second current source 50 and the second output terminal out2.

Thus, in the period "t3", the current of the first output terminal out1 is "A", and the current of the second output terminal out2 is "B".

In the case that there is a change in data transmission during the period "t3", the first select circuit 10 maintains the connection between the first current source 10 and the first output terminal out1, and the second select circuit 20 switches the current path of the second current source 50 to the first output terminal out1, thereby performing the pre-emphasis.

Thus, in the period "t4", the current of the first output terminal out1 is "A+B", and the current of the second output terminal out2 is "0".

In the case that the original state, that is, the period "t1" starts again after stopping the pre-emphasis operation in the period "t4", the first select circuit 10 switches the current path of the first current source 40 to the second output terminal out2, and the second select circuit 20 maintains the connection between the second current source 50 and the first output terminal out1.

Thus, in the period after "t4", the current of the first output terminal out1 is "B", and the current of the second output terminal out2 is "A", similarly to period "t1".

Hereinafter, the differential pre-emphasis driver according to a second embodiment will be described with reference accompanying drawings. The second embodiment provides a push-pull circuit based on the structure and operation of the first embodiment.

Figure 4:
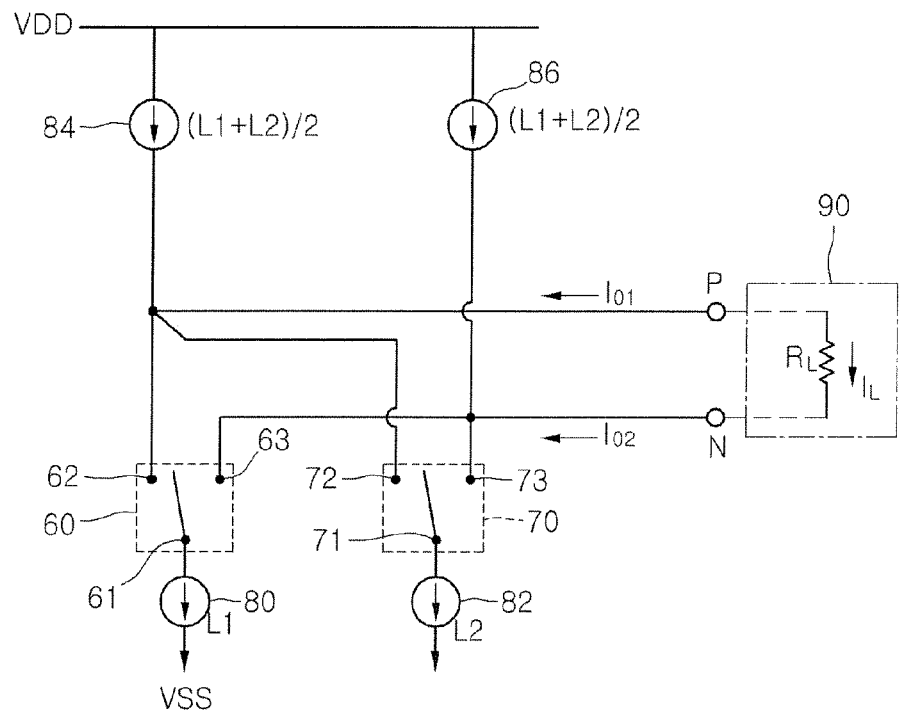
FIG. 4 is a circuit view schematically showing elements of a differential pre-emphasis driver according to a second embodiment.
Figure 5:
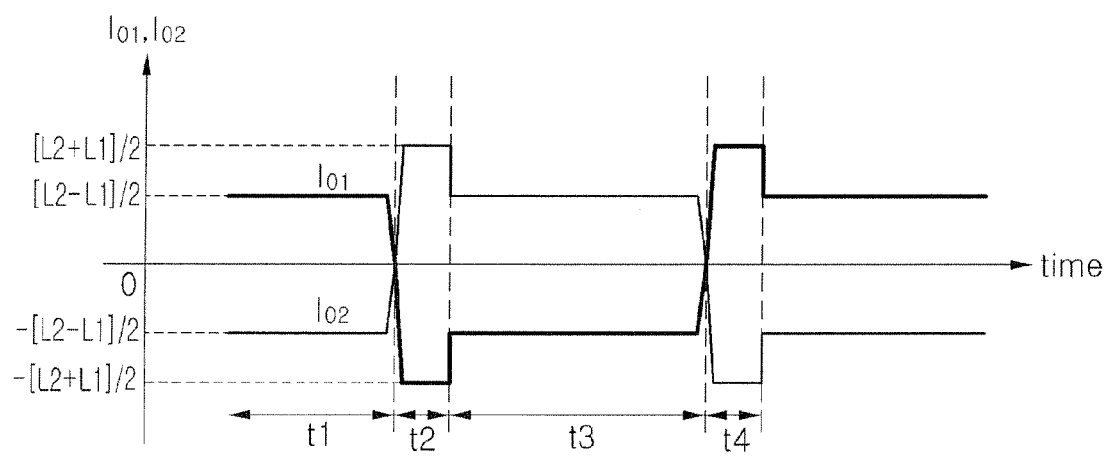
FIG. 5 is a graph showing a signal processed by a differential pre-emphasis driver according to a second embodiment.

FIG. 4 is a circuit view schematically showing elements of the differential pre-emphasis driver according to the second embodiment, and FIG. 5 is a graph showing a signal processed by the differential pre-emphasis driver according to the second embodiment.

Referring to FIG. 4, the differential pre-emphasis driver according to the second embodiment includes a first current source 80, a second current source 82, a third current source 84, a fourth current source 86, a first select circuit 60, a second select circuit 70, a first output terminal P, and a second output terminal N.

The circuit shown in FIG. 4 represents an equivalent circuit obtained by connecting a transmitter circuit, a transmission path and a receiver circuit 90 to one another. A power terminal VDD is connected to the third current source 84 and the fourth current source 86, and a ground terminal VSS is connected to the first current source 80 and the second current source 82.

Different from the first embodiment, the second embodiment provides a push-pull circuit structure, but the basic circuit structure and the operation of the second embodiment are similar to those of the first embodiment.

In addition, the receiver circuit 90 includes a resistance component $R_L$ connected to the first output terminal P and the second output terminal N through a transmission path (shown in dotted lines). Thus, current $I_L$, which is obtained by subtracting current $I_{o1}$ of the first output terminal P from current $I_{o2}$ of the second output terminal N, is applied to the receiver circuit 90.

Thus, the receiver circuit 90 can recover data by synthesizing a signal of the first output terminal P with a signal of the second output terminal N. For reference, a data recovery circuit is not shown, but an example of the synthetic data is shown in the graph of FIG. 5.

The output terminal of the first current source 80 is connected to the ground terminal VSS and the input terminal of the first current source 80 is connected to a first switching point 61 of the first select circuit 60, thereby forming the equivalent circuit to supply first current L1.

The output terminal of the second current source 82 is connected to the ground terminal VSS and the input terminal of the second current source 82 is connected to a second switching point 71 of the second select circuit 70, thereby forming the equivalent circuit to supply a second current L2 greater than the first current L1.

The third current source 84 and the fourth current source 86 supply an average current of the first and second currents L1 and L2, that is, (L1+L2)/2.

Intensity of the output currents are shown in the graph of FIG. 5.

A first contact point 62 of the first select circuit 60 and a third contact point 72 of the second select circuit 70 are connected to the first output terminal P and an output terminal of the third current source 84. In addition, and a second contact point 63 of the first select circuit 60 and a fourth contact point 73 of the second select circuit 70 are connected to the second output terminal N and an output terminal of the fourth current source 86.

The input terminals of the third and fourth current sources 84 and 86 are connected to the power terminal VDD.

Therefore, the first and second select circuits 60 and 70 can pre-emphasize the transmission signal by selectively combining the first output terminal P, the second output terminal N, the first current source 80, and the second current source 82. Hereinafter, the pre-emphasis operation will be described with reference to FIG. 5.

The first and second select circuits 60 and 70 according to the second embodiment perform the pre-emphasis operation by selectively combining current paths when there is a change in data transmission periods (see vertical dotted lines).

In the case that the first current source 80 is connected to the second output terminal N by the first select circuit 60 and the second current source 82 is connected to the first output terminal P by the second select circuit 70, signals $I_{o1}$ and $I_{o2}$ are output from the first and second output terminals P and N as shown in the period "t1" of FIG. 5.

In this case, the current $I_{o1}$ of the first output terminal P is "(L2−L1)/2", which can be calculated based on equation 1.

$$I_{o1} = L2 - (L1+L2)/2 \quad \text{Equation 1:}$$

In addition, the current $I_{o2}$ of the second output terminal N is "−(L2−L1)/2", which can be calculated based on equation 2.

$$I_{o2} = L1 - (L1+L2)/2 \quad \text{Equation 2:}$$

At this time, if there is a change in the data transmission periods (if there is attenuation in high-frequency band), the first and second select circuits 60 and 70 perform the pre-emphasis through switching operation.

That is, if the pre-emphasis operation is performed while the output is in the "t1" state, the first select circuit 60 maintains connection between the first current source 80 and the second output terminal N, and the second select circuit 70 switches the current path of the second current source 82 to the second output terminal N.

Thus, in the period "t2", the current $I_{o1}$ of the first output terminal P is "−(L1+L2)/2", which is the negative current of the third current source.

In addition, the current $I_{o2}$ of the second output terminal N is "(L1+L2)/2", which can be calculated based on equation 3.

$$I_{o2} = L1 + L2 - (L1+L2)/2 \quad \text{Equation 3:}$$

In the case that the period "t3" starts after stopping the pre-emphasis operation in the period "t2", the first select circuit 60 switches the current path of the first current source 80 to the first output terminal P and the second select circuit 70 maintains the connection between the second current source 82 and the second output terminal N.

Thus, in the period "t3", the current $I_{o1}$ of the first output terminal P is "−(L2−L1)/2", and the current $I_{o2}$ of the second output terminal N is "(L2−L1)/2".

The current calculation equations in remaining periods will be omitted, but can be readily understood from review of the circuit and/or reference to equations 1-3.

In the case that there is a change in data transmission during the period "t3", the first select circuit 60 maintains the connection between the first current source 80 and the first output terminal P, and the second select circuit 70 switches the current path of the second current source 82 to the first output terminal N, thereby performing the pre-emphasis.

Thus, in the period "t4", the current $I_{o1}$ of the first output terminal P is "(L1+L2)/2", and the current $I_{o2}$ of the second output terminal N is "−(L1+L2)/2".

In the case that the original state, that is, the state in period "t1" starts after stopping the pre-emphasis operation in the period "t4", the first select circuit 60 switches the current path of the first current source 80 to the second output terminal N, and the second select circuit 70 maintains the connection between the second current source 82 and the first output terminal P.

Thus, in the period after "t4", the current $I_{o1}$ of the first output terminal P is "(L2−L1)/2", and the current $I_{o2}$ of the second output terminal N is "−(L2−L1)/2", similar to the period "t1".

Hereinafter, a differential pre-emphasis driver according to a third embodiment will be described in detail with reference to accompanying drawings.

Figure 6:
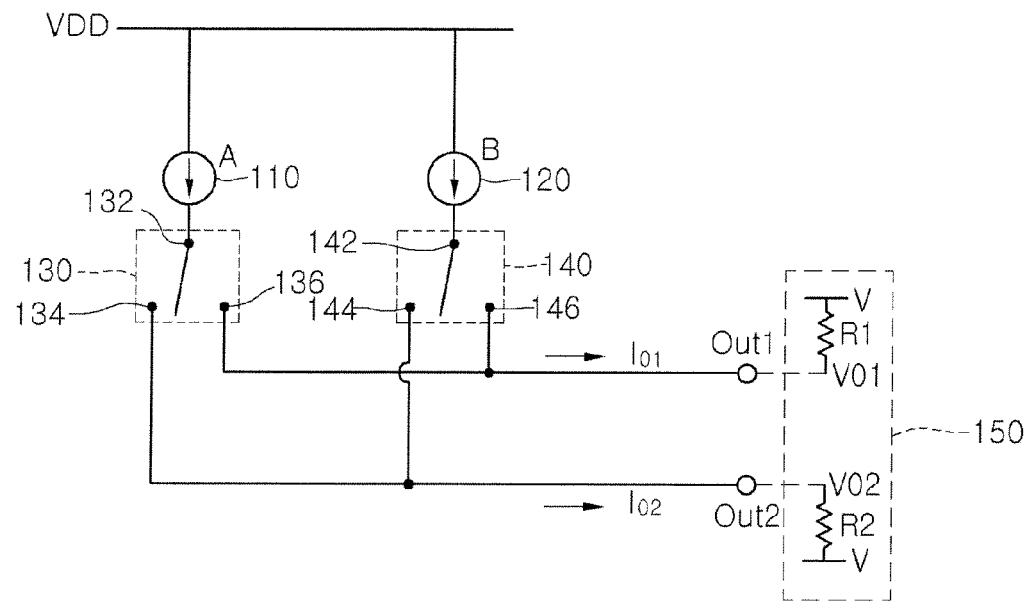
FIG. 6 is a circuit view schematically showing elements of a differential pre-emphasis driver according to a third embodiment.
Figure 7:
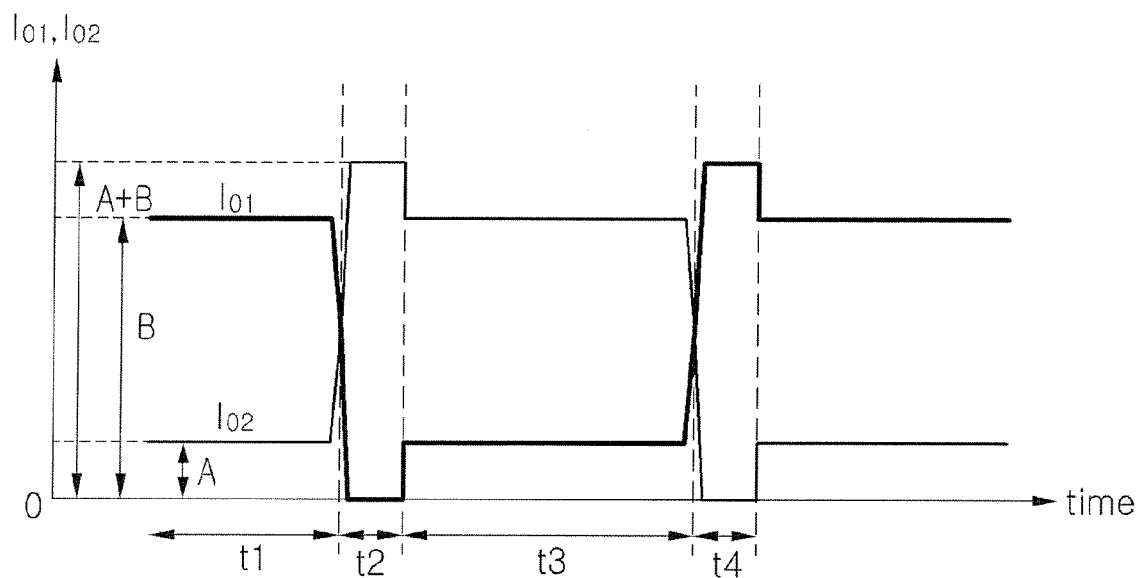
FIG. 7 is a graph showing a signal processed by a differential pre-emphasis driver according to a third embodiment.

FIG. 6 is a circuit view schematically showing elements of the differential pre-emphasis driver according to the third embodiment, and FIG. 7 is a graph showing a signal processed by the differential pre-emphasis driver according to the third embodiment.

Similar to the first embodiment that serves as a base for the second embodiment, the third embodiment provides a differential pre-emphasis driver having a structure that serves as a base for the fourth embodiment having the push-pull structure.

In this regard, the third embodiment is similar to the first embodiment, so the third embodiment will be described with reference to the first embodiment.

Referring to FIG. 6, the differential pre-emphasis driver according to the third embodiment includes a first current source 110, a second current source 120, a first select circuit 130, a second select circuit 140, a first output terminal out1, and a second output terminal out2.

The circuit shown in FIG. 6 represents an equivalent circuit obtained by connecting a transmitter circuit, a transmission path and a receiver circuit 150 to one another. A power terminal V exists in the receiver circuit 150. The power terminal V is connected to the first output terminal out1 and the second output terminal out2 through the transmission path (shown in dotted line) and resistors R1 and R2.

In the following description, the structure and operation that have been described in the first embodiment will be omitted in order to avoid redundancy.

The third embodiment is different from the first embodiment in that the first and second current sources 110 and 120 are connected to the power terminal VDD. Therefore, current flows from the first and second current sources 110 and 120 to the select circuits 130 and 140, and current flows from the first and second output terminals out1 and out2 to the outside.

However, although polarity of current is changed, data analyzed by the receiver circuit 150 is identical to data analyzed by the receiver circuit 30 of the first embodiment.

According to the third embodiment, an input terminal of the first current source 110 is connected to the power terminal VDD and an output terminal of the first current source 110 is connected to a first switching point 132 of the first select circuit 130, thereby forming the equivalent circuit to supply first current A.

The input terminal of the second current source 120 is connected to the power terminal VDD and the output terminal of the second current source 120 is connected to a second switching point 142 of the second select circuit 140, thereby forming the equivalent circuit to supply a second current B greater than the first current A.

Intensity of the output currents, including the first and second currents A and B, are shown in the graph of FIG. 7.

In addition, a first contact point 136 of the first select circuit 130 and a third contact point 146 of the second select circuit 140 are connected to the first output terminal out1, and a second contact point 134 of the first select circuit 130 and a fourth contact point 44 of the second select circuit 140 are connected to the second output terminal out2.

Therefore, the first and second select circuits 130 and 140 can pre-emphasize the transmission signal by selectively combining the first output terminal out1, the second output terminal out2, the first current source 110 and the second current source 120.

When comparing FIG. 7 with FIG. 3, the current $I_{o1}$ of the first output terminal out1 is identical in both graphs and the current $I_{o2}$ of the second output terminal out2 is identical in both graphs for each period (t1 to t4). In addition, the operation of elements disclosed in the third embodiment is identical to that of the first embodiment, so it will not be further described below in order to avoid redundancy.

Hereinafter, the differential pre-emphasis driver according to a fourth embodiment will be described with reference to FIGS. 8 and 9. The fourth embodiment provides a push-pull circuit based on the structure and operation of the third embodiment.

In this regard, the fourth embodiment is similar to the second embodiment, so the fourth embodiment will be described with reference to the second embodiment.

In other words, the fourth embodiment is suggested by taking difference between the third embodiment and the first embodiment into consideration.

Figure 8:
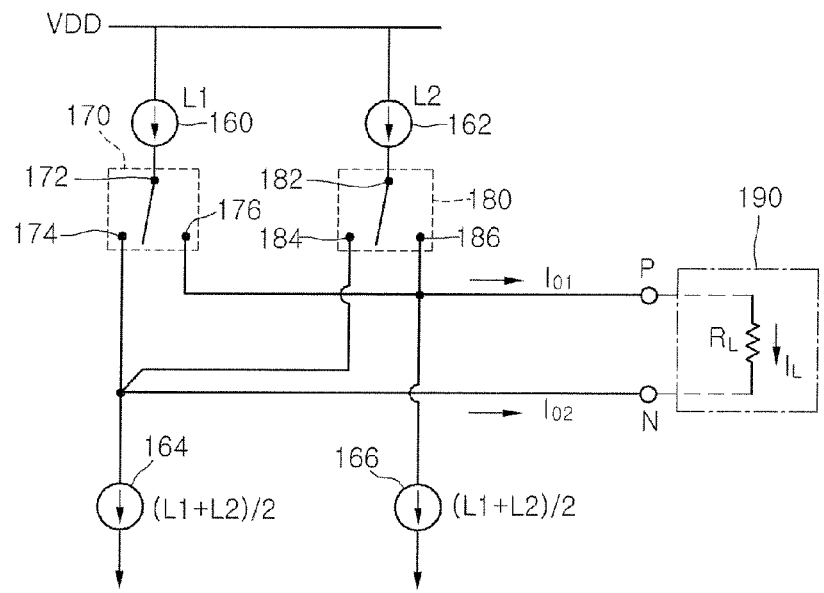
FIG. 8 is a circuit view schematically showing elements of a differential pre-emphasis driver according to a fourth embodiment.
Figure 9:
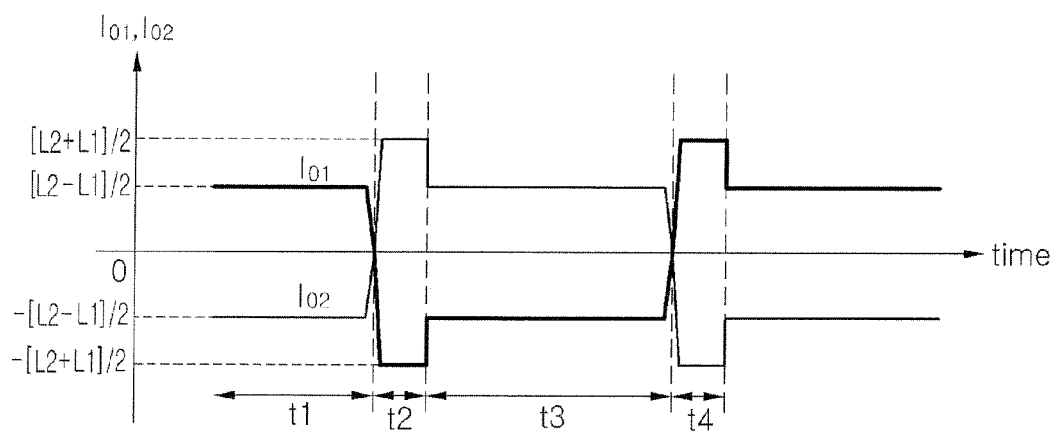
FIG. 9 is a graph showing a signal processed by a differential pre-emphasis driver according to a fourth embodiment.

FIG. 8 is a circuit view schematically showing elements of the differential pre-emphasis driver according to the fourth embodiment, and FIG. 9 is a graph showing a signal processed by the differential pre-emphasis driver according to the fourth embodiment.

Referring to FIG. 8, the differential pre-emphasis driver according to the fourth embodiment includes a first current source 160, a second current source 162, a third current source 166, a fourth current source 164, a first select circuit 170, a second select circuit 180, a first output terminal P and a second output terminal N.

The circuit shown in FIG. 8 represents an equivalent circuit obtained by connecting a transmitter circuit, a transmission path and a receiver circuit 190 to one another. Input terminals of the first current source 160 and the second current source 162 are connected to the power terminal VDD, and a ground terminal VSS is connected to output terminals of the third current source 166 and the fourth current source 164.

Different from the third embodiment, the fourth embodiment provides a push-pull circuit structure, but the basic circuit structure and the operation of the fourth embodiment are similar to those of the third embodiment.

In addition, the fourth embodiment is different from the second embodiment in that the first and second current sources 160 and 162 are interchanged with the third and fourth current sources 166 and 164, and current flow is changed for each node.

However, although polarity of current is changed, data analyzed by the receiver circuit 190 is identical to data analyzed by the receiver circuit 90 of the second embodiment.

In addition, the receiver circuit 190 includes a resistance component $R_L$ connected to the first output terminal P and the second output terminal N through a transmission path (shown in dotted lines). Thus, current $I_L$, which is obtained by subtracting the current $I_{o1}$ of the first output terminal P from the current $I_{o2}$ of the second output terminal N, is applied to the receiver circuit 190.

Thus, the receiver circuit 190 can recover data by synthesizing a signal of the first output terminal P with a signal of the second output terminal N. An example of the synthetic data is shown in FIG. 9.

The input terminal of the first current source 160 is connected to the power terminal VDD and the output terminal of the first current source 160 is connected to a first switching point 172 of the first select circuit 170, thereby forming the equivalent circuit to supply first current L1.

The input terminal of the second current source 162 is connected to the power terminal VDD and the output terminal of the second current source 162 is connected to a second switching point 182 of the second select circuit 180, thereby forming the equivalent circuit to supply a second current L2 greater than the first current L1.

The third current source 164 and the fourth current source 166 supply an average current of the first and second currents L1 and L2, that is, (L1+L2)/2.

Intensity of the output currents are shown in the graph of FIG. 9.

A first contact point 176 of the first select circuit 170 and a third contact point 186 of the second select circuit 180 are connected to the first output terminal P and the input terminal of the third current source 166. In addition a second contact point 174 of the first select circuit 170 and a fourth contact point 184 of the second select circuit 180 are connected to the second output terminal N and the input terminal of the fourth current source 164.

The input terminals of the third and fourth current sources 166 and 164 may be connected to the ground terminal VSS.

Therefore, the first and second select circuits 170 and 180 can pre-emphasize the transmission signal by selectively combining the first output terminal P, the second output terminal N, the first current source 160 and the second current source 162.

When comparing FIG. 9 with FIG. 5, the current $I_{o1}$ of the first output terminal P is identical in both graphs and the current $I_{o2}$ of the second output terminal N is identical in both graphs for each period (t1 to t4). In addition, the operation of elements disclosed in the fourth embodiment is identical to that of the second embodiment, so it will not be further described below in order to avoid redundancy.

The described embodiments have following effects.

First, the differential pre-emphasis driver can be obtained with a minimum number of select circuits, so that the differential pre-emphasis driver can be easily controlled and the circuit area can be reduced.

Second, it is not necessary to synchronize the select circuits, so the differential pre-emphasis driver can be easily manufactured and data recovery is very easy at the receiver terminal while facilitating opening/closing of selected paths.

Third, since the differential pre-emphasis driver can be operated while constantly maintaining DC current, noise may not occur even in the high-speed operation.

Fourth, since the pre-emphasis operation is performed by switching current paths without changing intensity of the current, the differential pre-emphasis driver is advantageous in high-speed operation and has superior property against noise.

Fifth, in the case of the differential pre-emphasis driver employing the push-pull circuit, the current source supplying relatively lower current can be driven without switching operation, and the current source supplying relatively higher current can perform push operation or pull operation switching operation, so that discontinuity of current can be inhibited.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A differential pre-emphasis driver comprising:
   a first current source supplying a first current;
   a second current source supplying a second current greater than the first current;
   a third current source supplying an average magnitude of the first and second currents;
   a fourth current source supplying an average magnitude of the first and second currents;
   a first select circuit including a first switching point connected to the first current source for switching into a first contact point or a second contact point; and
   a second select circuit including a second switching point connected to the second current source for switching into a third contact point or a fourth contact point,
   wherein the first contact point is connected to the third current source, a first output terminal and the third contact point, and wherein the second contact point is connected to the fourth current source, a second output terminal and the fourth contact point,
   wherein input terminals of the first and second current sources are connected to a power terminal, and output terminals of the first and second current sources are connected to the first select circuit and the second select circuit, respectively, and
   wherein output terminals of the third and fourth current sources are connected to a ground terminal, and input terminals of the third and fourth current sources are connected to the first output terminal and the second output terminal, respectively.

2. The differential pre-emphasis driver of claim 1, wherein the first and second select circuits selectively combine the first output terminal, the second output terminal, the first current source, and the second current source when a change occurs in a data transmission period.

3. The differential pre-emphasis driver of claim 1, wherein the first current source, the second current source, the third current source, the fourth current source, the first select circuit and the second select circuit constitute a transmitter circuit, and
   wherein data is output from the first and second output terminals of the transmitter circuit through a transmission path to a receiver circuit that recovers data by synthesizing a signal of the first output terminal with a signal of the second output terminal.

4. The differential pre-emphasis driver of claim 1, wherein, when a pre-emphasis operation is performed in a state in which the first current source is connected to the second output terminal by the first select circuit and the second current source is connected to the first output terminal by the second select circuit, the first select circuit maintains connection between the first current source and the second output terminal and the second select circuit switches to connect the second current source to the second output terminal.

5. The differential pre-emphasis driver of claim 1, wherein, when a pre-emphasis operation is stopped in a state in which the first current source is connected to the second output terminal by the first select circuit and the second current source is connected to the second output terminal by the second select circuit, the first select circuit switches to connect the first current source to the first output terminal and the second select circuit maintains connection between the second current source and the second output terminal.

6. The differential pre-emphasis driver of claim 1, wherein, when a pre-emphasis operation is performed in a state in which the first current source is connected to the first output terminal by the first select circuit and the second current source is connected to the second output terminal by the second select circuit, the first select circuit maintains connection between the first current source and the first output terminal and the second select circuit switches to connect the second current source to the first output terminal.

7. The differential pre-emphasis driver of claim 1, wherein, when a pre-emphasis operation is stopped in a state in which the first current source is connected to the first output terminal by the first select circuit and the second current source is connected to the first output terminal by the second select circuit, the first select circuit switches to connect the first current source to the second output terminal and the second select circuit maintains connection between the second current source and the first output terminal.

* * * * *